United States Patent [19]

Truex et al.

[11] Patent Number: 4,792,401

[45] Date of Patent: Dec. 20, 1988

[54] SPIRAL WOUND MEMBRANE MODULE AND METHOD OF MANUFACTURE AND USE

[75] Inventors: Todd A. Truex, Charlestown; Clyde W. Fulk, Jr., Haverhill, both of Mass.

[73] Assignee: Koch Membrane Systems, Inc., Wilmington, Mass.

[21] Appl. No.: 202,711

[22] Filed: Jun. 3, 1988

[51] Int. Cl.⁴ .......................................... B01D 13/00
[52] U.S. Cl. .................................... 210/644; 210/652; 210/321.74; 210/321.83
[58] Field of Search ............... 210/634, 644, 649, 650, 210/651, 652, 653–655, 321.74, 321.78, 321.83, 321.87, 321.84, 336, 321.61, 490, 500.36, 497.1

[56] References Cited

U.S. PATENT DOCUMENTS

| | | | |
|---|---|---|---|
| 3,986,961 | 10/1976 | Martinez | 210/321.74 |
| 4,033,878 | 7/1977 | Foreman et al. | 210/336 |
| 4,134,742 | 1/1979 | Schell | 210/490 |
| 4,137,113 | 6/1979 | Kawamaru et al. | 210/321.84 |
| 4,277,340 | 7/1981 | Kanamaru et al. | 210/321.83 |
| 4,384,047 | 5/1983 | Benzinger et al. | 210/500.36 |
| 4,475,973 | 10/1984 | Tanaka et al. | 210/497.1 |
| 4,582,726 | 4/1986 | Shuey et al. | 210/321.61 |

OTHER PUBLICATIONS

The 1987 International Congress on Membranes and Membrane Processes; ICOM '87, ANA Hotel, Tokyo, Japan; Jun. 8–12, 1987, pp. 6P—24 to 6P—25.

Primary Examiner—Frank Sever
Attorney, Agent, or Firm—Richard P. Crowley

[57] ABSTRACT

A spirally wound, high flux membrane module which comprises a feed inlet, a concentration outlet and two permeate outlets and one or more membrane leaves wrapped about a central permeate flow tube to define a permeate flow path in one or more of the membrane leaves and wherein the improvement comprises one or more of the membrane leaves containing two or more separate permeate flow compartments within the membrane leaf to provide for the separate permeate flow of the permeate within the separator compartments to the permeate outlet thereby reducing the area of the permeate back pressure and reducing membrane wrinkling and membrane failure particularly during the membrane cleaning cycles. A method of reducing permeate back pressure within a spirally wound membrane module, which method comprises subdividing the permeate flow path in one or more of the spirally wound membrane leaves into two or more separate permeate flow compartments to provide for the separate radial permeate flow of the permeate to the permeate central tube and permeate outlet.

12 Claims, 2 Drawing Sheets

SPIRAL WOUND MEMBRANE MODULE AND METHOD OF MANUFACTURE AND USE

BACKGROUND OF THE INVENTION

Spirally wound membrane modules are often employed alone or in combination for the separation of materials by high pressure reverse osmosis, for example, for the production of pure water from brine; or low pressure ultrafiltration, for example, in the dairy field, such as for the separation of dairy solutions. The spiral wound membrane module which fits into a cylindrical outer housing shell comprises a central tube sealed within the shell and having a plurality of holes or slots therein which serve as permeate collection means and one or more membrane leaves wrapped around the central tube. The membrane leaf typically comprises a pair of flat sheet membranes selected to effect the desired separation with the membranes separated by an open porous-type mesh material, such as tricot, as a permeate collection material and which forms a permeate collection channel. The membrane leaves are generally separated by a net-like feed channel spacer which can also serve as the bypass. In operation, a feed solution to be separated is introduced into one end of the cylinder and flows directly axially along the feed channel and bypass spacer, and a concentrate stream is removed from the other end of the shell. The permeate which passes through the membrane sheets flows radially through the permeate collection means toward the central tube, and is removed from the central tube at a permeate outlet. Thus, the feed flow is axial across the membrane leaf surface while the permeate flow is radial toward the central tube.

The membrane envelope or leaves are secured together at the outer edges by an adhesive to form a peripheral radial adhesive zone at each end and an axial adhesive zone toward the outer periphery with the inner periphery in permeate communication with the passageways in the central tube. Spirally wound membrane modules and their construction are well known and are illustrated, for example, in U.S. Pat. No. 3,367,505 and other patents.

A particular spirally wound membrane module for osmosis separations is described in U.S. Pat. No. 4,033,878 issued July 5, 1977, hereby incorporated by reference in its entirety. This patent describes a membrane module wherein flow blocking techniques are employed both in the central tube and also in the individual membrane leaves in order to induce a serpentine-type flow of one stream in the membrane envelope.

Spiral wound membrane modules, particularly low pressure modules used for ultrafiltration, such as in the dairy field for the separation of whey, are subject to a cleaning operation after periods of use, generally by the use of chemical cleaning solutions, such as caustics, detergents, chlorine, or combinations thereof, and thereafter, rinsed with clean water. During such cleaning operation, there is a significant increase in permeate flux due to the removal of the fouling layer on the membrane surface. The high increase in flux during the cleaning operation causes an excessively high pressure within the permeate channel because of the higher flux. The increased pressure within the permeate channel often causes wrinkles to occur in parts of the membrane leaf, and the zone may fail due to embrittlement and cracking under the high pressure and high flux conditions. These wrinkle and leak problems are confined particularly to high flux ultrafiltration spiral membrane modules and not to reverse osmosis membrane modules which usually operate at high pressures of 300 psi or more and low flux. Therefore, it is desirable to provide a spirally wound membrane module for low pressure operation, such as ultrafiltration, which will have a reduced tendency to wrinkle or leak in operation or particularly during a cleaning cycle of the spirally wound membrane module and to a method of manufacturing and using such modules.

SUMMARY OF THE INVENTION

The present invention is directed to an improved high flux, low pressure spiral wound membrane module and to a method of manufacturing and using such membrane modules. In particular, the invention concerns a spirally wound membrane module having a reduced tendency of the membrane leaves to wrinkle or leak due to high permeate back pressure.

An improved spirally wound membrane modules has been discovered which membrane module comprises a feed inlet for the introduction of a feed stream at one end, a concentrate outlet for the removal of a concentrate stream at the other end and a permeate outlet for the withdrawal of a permeate stream. The module also comprises one or more membrane leaves composed of inner and outer membranes and a porous permeate channel spacer. The one or more leaves are wrapped about a central permeate tube with the open passage of permeate flow from the leaves into the central permeate tube. The leaves define a radial permeate flow path in one or more of the leaves and wherein one or more of the leaves contain two or more separate radial permeate flow compartments within the leaf by subdivision of the leaf. The subdivided leaf provides for separate, direct, non-serpentine, radial flow of the permeate to the central tube and to the permeate outlet thereby reducing or preventing the axial flow of permeate and the resulting pressure distribution which causes high permeate pressure at the outlet tail of the leaf. The reduction in pressure significantly reduces wrinkles or adhesion zone seam blow out during module operation or more particularly, during the cleaning cycle of the high flux spirally wound membrane module.

The improved high flux spirally wound membrane modules of the invention are prepared by subdividing one or more and preferably all of the membrane leaves, such as by employing another adhesive zone or glue line to subdivide the leaves of the membrane modules into two or more separate permeate flow compartments. Generally, the subdivision is by employing an additional radial adhesive or glue line zone subdividing the leaf into two separate and equal permeate flow compartments. More than two permeate compartments may be formed, however additional glue lines or adhesive zones results in the loss of the effective membrane area.

The improved membrane modules in use provide for the radial flow of the permeate within each of the membrane leaves as before, but in separate permeate compartments, so that the high pressure developed on one corner portion of the spirally wound membrane module is not carried to the outer low process pressure end of the module. The partition between the compartments restricts the axial flow of permeate, thereby creating a more favorable permeate pressure distribution. The improved pressure distribution results in a reduction in wrinkles and reduction in leakage due to seam blow out.

These improvements are a result of dividing the permeate flow channel into two or more compartments. This spirally wound membrane module prevents the permeate from the high pressure feed end of each leaf from flooding the low pressure concentrate end of the leaf and therefore eliminates the loss of productivity due to a reduction in the transmembrane pressure driving force. Also, it improves spiral life by reducing the wrinkling, reverse permeation and adhesive seam blow out as in the prior art high flux modules. In addition, the improved spirally wound membrane modules may be subject to usual cleaning techniques without the difficulties associated with the high flux and the high pressure causing problems during the cleaning cycle.

It has been found that after the cleaning of a high flux spirally wound membrane module, wrinkles are discovered in the lower pressure far outer corner of the leaf adjacent the permeate outlet, and eventually the membrane leaks or the adhesive zone leaks. Further investigation of the leaks has unexpectedly discovered that the permeate pressure in the permeate channel over a defined corner area has been found to be greater than the feed pressure of the feed stream leading to the wrinkles and blow out together with reverse permeation. The problem of wrinkles and leak often come up on the cleaning cycle in high flux, low pressure operation modules due to the high flux, for example, fluxes of 100 liters per square meter per hour or more, and feed pressures employed, for example, feed pressures of about 50–100 psi and outlet pressures per module of 20–30 psi less than the feed pressure. It has been found that the current spiral leaf ultrafiltration membrane module designs are inefficient due to back pressure of the permeate leaving a dead membrane area to occur in the low corner pressure end of the module leaf. The permeate back pressure of the leaf wherein an additional adhesive zone is employed dividing the leaf into at least two separate permeate compartments reduces the pressure differential across the leaf compartment and reduces the amount of dead pressure permeate leaf area.

When the flux ranges from about 3 to 4 gallons or higher per square foot per day per psi, the problems of seam blow out and wrinkles occur and, for example, when the pressure drop across the module is greater than 15 psi, for example, 20 psi or more.

It has also been found that a reduction in differential pressure and the problems associated therewith may be resolved by increasing the number of leaves in the spiral membrane module and making the leaves shorter in length. This solution has also been noted by a publication at the 1987 International Congress on Membranes and Membrane Processes in Tokyo, Japan, June 8–12, 1987, Publication 6-P 24 of Yasuo Koseki et al. A high flux spiral wound membrane-type ultrafiltration membrane module is disclosed with increased permeate flux by optimizing the membrane shape and decreasing the resistance of the spacer in the leaf that forms the permeate flow path. The solution of shortening the linear length of the leaves or using a permeate spacer of lower flow resistance is helpful, but is not practical or economically effective. For example, by using a permeate path spacer of lower flow resistance, the permeate flux will be at a higher rate; however, it is the downstream piping system which is the limitation since the spiral membrane modules are typically employed in a series. Further, while an increase in productivity can also be obtained by increasing the number of leaves and using shorter leaves, this solution is also not practical, since during the cleaning cycle, the flux of the membrane module is enhanced so the pumps cannot handle the increased flux thereby creating a new overall system problem.

An effective, practical and economic solution to permeate back pressure and the dead permeate area in the outer low pressure corner of each spiral membrane module leaf is by compartmentalizing the permeate flow in each leaf into two or more separate radial flow permeate flow channels by employing at least one other adhesive glue or seam line. In theory, one can have an infinite number of separate permeate flow compartments formed, but in practice two or three at the most are practical since the use of additional seam lines result in the loss of active membrane area. Use of compartmentalization of the permeate flow channel does not wholly eliminate the problem of permeate back flow pressure; however, it significantly and unexpectedly reduces the problem and avoids the difficulties associated with the creation of permeate back pressure in the present high flux spiral wound membrane modules.

The separate compartments of the permeate flow channels may be formed in any manner by permeate flow blocking means, but typically a thin glue or adhesive line is employed, such as employed in the outer radial and axial glue seams of the spirally wound membrane modules. Typical adhesives used are polyurethane, epoxy resins or adhesive, thermosetting-type resins and sealants. The selection of the membrane depends upon the particular separation desired. The membrane material employed may comprise fluorocarbon membrane such as polyvinylene difluoride, polysulfones, cellulosic or other natural or synthetic polymeric-type membranes. Generally, commercial-type spirally wound membrane modules vary from about 4 to 12 inches in diameter and from about 30 to 48 inches in length and employ one or more membrane leaves having the same width as the module housing and multiple modules may be placed in the same housing.

The invention will be described for the purposes of illustration only in connection with certain embodiments; however, it is recognized that those persons skilled in the art may make various changes, modifications, additions and improvements to the illustrated embodiments without departing from the spirit and scope of the invention.

DESCRIPTION OF THE EMBODIMENTS

Figure 1:
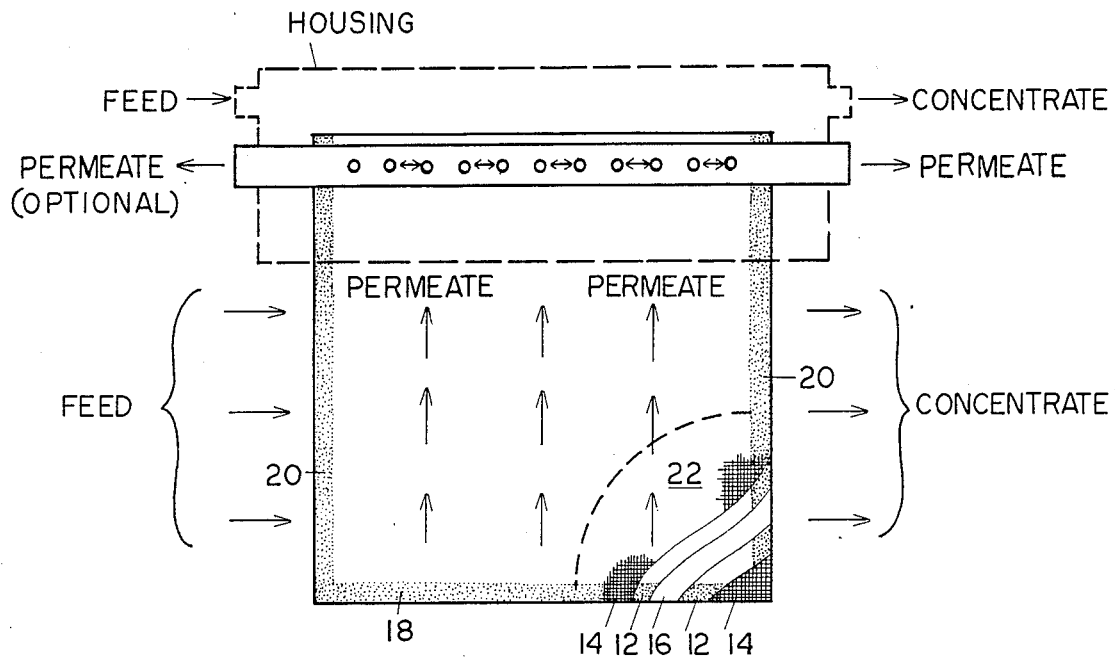
FIG. 1 is a perspective, partially cut away, sectional view of a prior art spiral membrane module with the membrane leaf shown in an unrolled, plan view.

FIG. 1 illustrates the present state of the art wherein a prior art spiral membrane 10 having a module leaf 12 is composed of a pair of high flux membranes 14 spaced apart by a permeate tricot spacer 16 which forms a radial permeate flow path. The leaf is separated in roll form by a feed spacer 16. The cylindrical housing for the leaf is shown in dotted lines. The radial permeate flow is illustrated by the dotted arrows as directed toward the central permeate collection tube having permeate hole passageways therein and with the feed stream being introduced within the membrane leaf spacer axially across each surface of the membranes and a concentrate stream removed from the other end of the module. As illustrated, the leaf forms a sealed envelope due to the peripheral axial 18 and the two radial adhesive zones or seams 20 shown in the shaded area along the outer peripheral edges to form the permeate flow path. The dotted line in the outer peripheral low pressure concentrate outlet leaf corner illustrates the discovered non-productive membrane area 22 due to the high permeate back pressure. This area has been found to be subject to leaks and wrinkling wherein the permeate pressure exceeds the feed pressure and where reverse permeation may occur, which in effect represents a dead area of the membrane caused by the pressure difference between the feed inlet and concentrate outlet.

Figure 2:
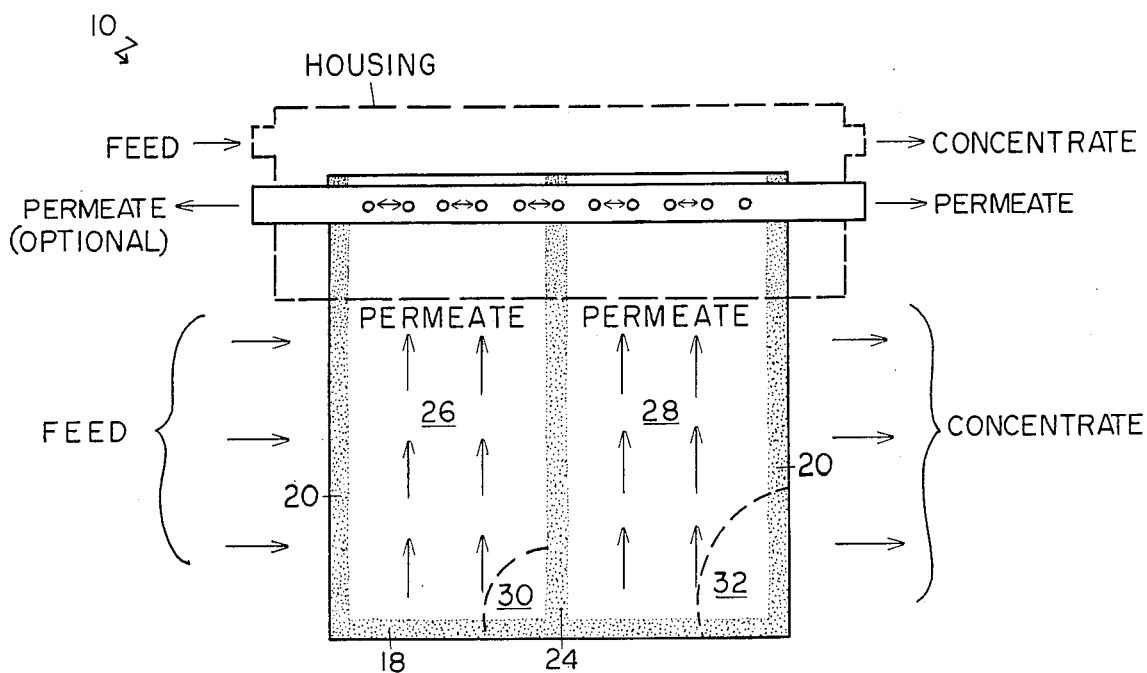
FIG. 2 is a perspective, sectional, cut away view of the spiral membrane module of FIG. 1 with the invention.

FIG. 2 is a perspective, partially cut away, sectional view of a spiral membrane module of the improved membrane module of the invention which contains an additional axial glue seam or adhesive zone 24 shown in the shaded area subdividing and compartmentalizing the leaf into two generally equal radial permeate flow compartments 26 and 28 with radial permeate flow illustrated by the arrows. The permeate flow is removed directly from the central permeate collection tube. The adhesive used may be the same or different as the adhesive or sealing means used in the axial and radial peripheral zones.

The general non-productive areas 30 and 32 of each of the separate permeate flow compartments is illustrated as a dotted line in each compartment, while the separate radial permeate flow in each compartment is illustrated by the directional flow arrows. The permeate flow is in the same direction as before, but in separate compartments, and as should be noted, the non-productive area due to the permeate back pressure is significantly and unexpectedly reduced by the use of the separate compartments. For example, the dead or non-productive area 22 in a prior art spiral membrane module of FIG. 1 may represent from about 20% to 30% of one outer corner of the leaf, while in the present, improved spiral membrane module design the dead area would represent less than about 10% when the dead area of each separate compartment 26 and 28 is taken in total. Of course, if multiple compartments are used, the dead area would be further reduced, but the amount of active membrane area would also be reduced. As illustrated, the subdivision into the two separate compartments forms equal compartments of generally equal area and equal dimensions.

Figure 3:
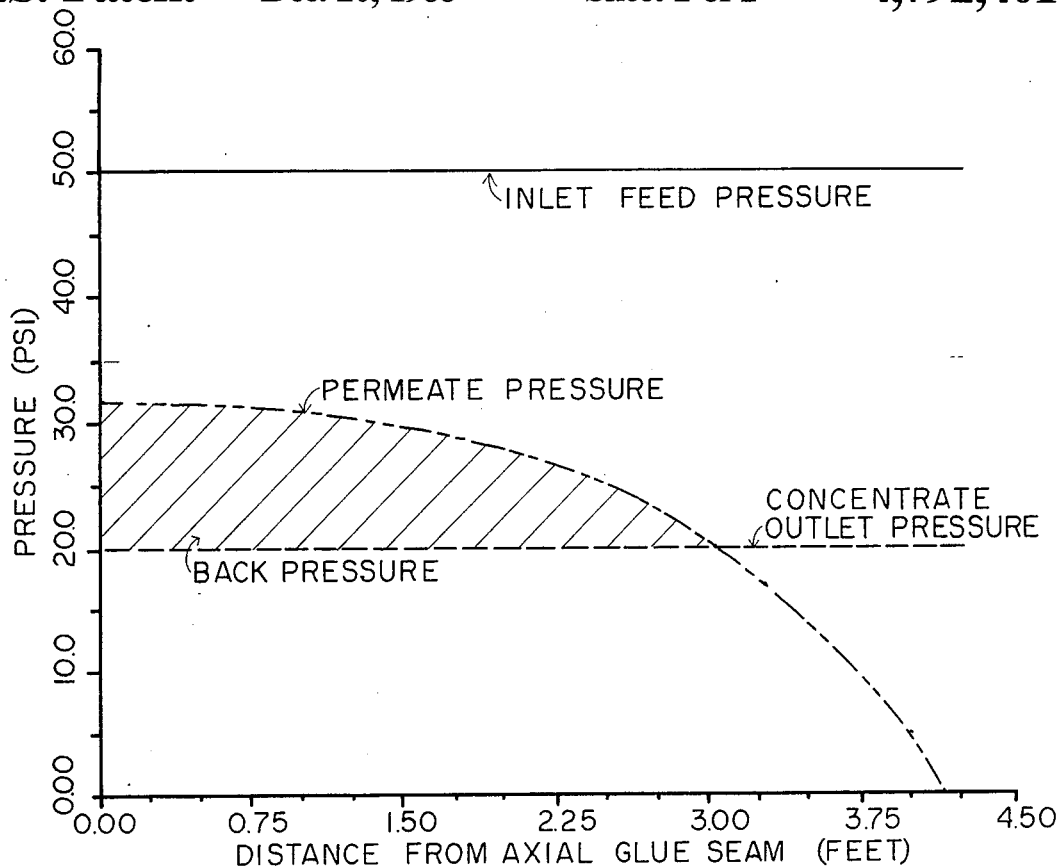
FIG. 3 is a graphical representation of a pressure profile of a prior art spiral membrane module of FIG. 1.
Figure 4:
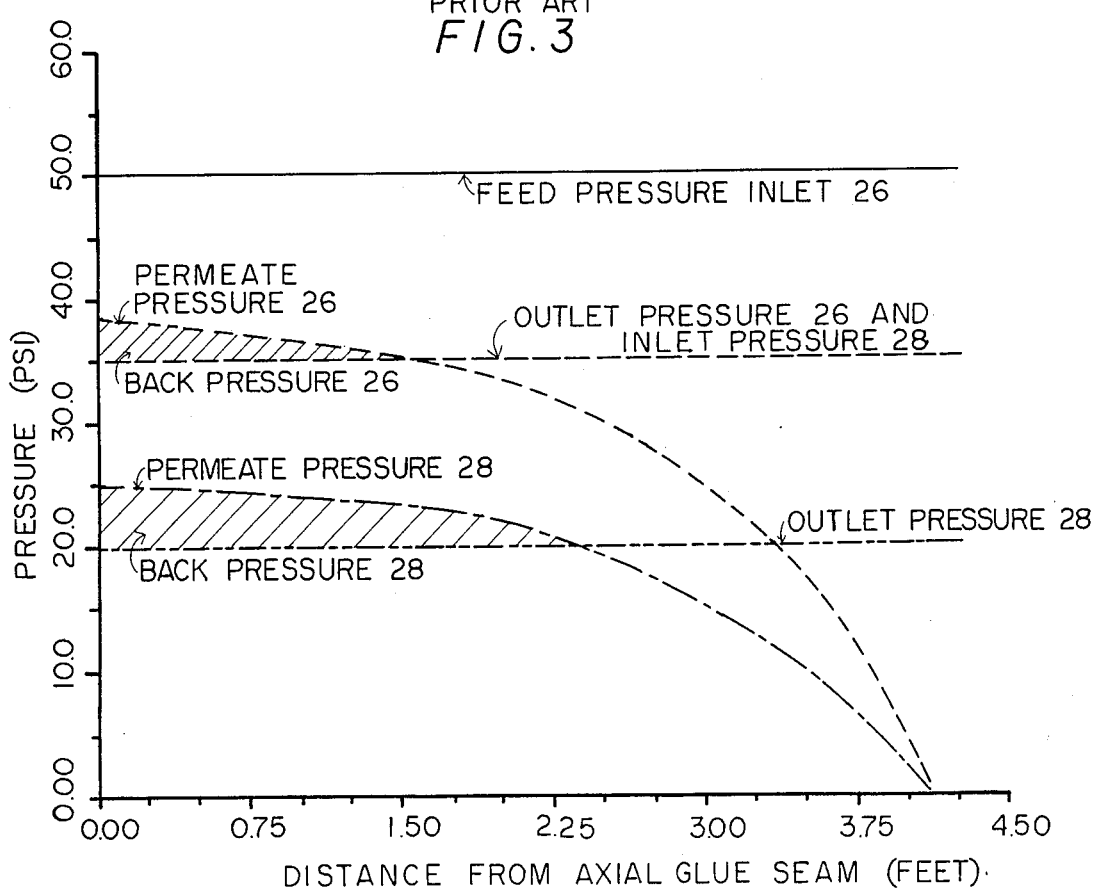
FIG. 4 is a graphical representation of a pressure profile of the spiral membrane module of FIG. 2 of the invention.

The dramatic effect on the pressure profiles of the prior art membrane of FIG. 1 and the spiral module membrane of the present invention of FIG. 2 is graphically illustrated in FIGS. 3 and 4 which represent the pressure profiles of a standard, commercial-type spiral wound membrane module, each comprising a 50-inch membrane leaf, 4 mil equivalent height and 4 gfd/psi permeability at 120° F. and wherein the pressure profile has been taken to measure the permeate pressure in psi versus the distance from the axial glue seam in feet. As illustrated more particularly in FIG. 3, it can be seen that the permeate pressure exceeds the outlet pressure in the illustrated area of the graph. In FIG. 4, which employs the subdivision of the membrane leaf, as illustrated in FIG. 2, the shaded area in the graph is significantly reduced with the pressure difference in the first compartment 26 ranging in difference from about 39 to 35 psi, while in the second compartment 28 ranging from about 25 to 20 psi, so that the dead or non-productive area in the corner of each compartment is reduced by the compartmentalizing of the leaf which provides for a practical and economical solution to the problems associated with permeate back pressure in spiral leaf membrane modules.

What is claimed is:

1. A high flux, spiral wound membrane module which comprises:
  (a) a housing having a one and other end;
  (b) a central tube having a one and other end and within the housing and characterized by a passageway means therein for the collection of permeate;
  (c) a membrane leaf means spirally wound about the central tube and which comprises a first and second membrane sheet and a porous sheet between said membrane sheets to form a single permeate radial flow compartment, the outer axial edge and radial side edges of the membrane sealed to form a membrane leaf with the inner axial edge in a permeate flow communication with said permeate collection passageways;
  (d) spacer means between the spirally wound membrane leaf means to define a flow channel means;
  (e) feed inlet means to provide for the introduction of a pressurized feed stream at the one end of the housing and to flow axially in the flow channel means;
  (f) concentrate outlet means to provide for the withdrawal of a concentrate stream at the other end of the housing; and
  (g) permeate outlet means to provide for the withdrawal of a permeate stream from the central tube, the improvement which comprises:
    means for providing a substantially wrinkle-free membrane leaf means sufficient to provide for the separate radial flow of the permeate in each compartment into the passageway means of the central tube to restrict the axial flow of permeate and to provide for a more favorable permeate pressure distribution in the outer low process pressure corner portion of the leaf means including two or more separate sealed radial permeate flow compartments within said membrane leaf means.

2. The module of claim 1 wherein the membrane leaf means comprises two separate, generally equal size permeate flow compartments.

3. The module of claim 1 wherein the membrane leaf means comprises a radially extending adhesion zone to divide the said single compartment into two or more separate permeate flow compartments.

4. The module of claim 1 wherein the permeate outlet means is only at theother end of the central tube.

5. The module of claim 1 wherein the membrane sheets of the membrane leaf means have a flux of 100 liters per square meter of membrane area per hour or more.

6. In a method for the separation of a fluid feed stream by a high flux, spiral wound ultrafiltration membrane module into a permeate stream and a concentrate stream which method comprises:

(a) flowing a feed stream to be separated into one end and axially across the surface of a spirally wound membrane leaf;
(b) withdrawing an axially flowing concentrate stream at the other end of the membrane leaf;
(c) flowing a permeate stream radially within a single sealed compartment of the membrane leaf to a central tube permeate collection means; and
(d) withdrawing a permeate stream from the central tube permeate collection means, the improvement which comprises:
providing a substantially wrinkle-free membrane leaf means including, two or more separate sealed permeate flow compartments in the membrane leaf into the permeate collection means to reduce the membrane area of the membrane leaf means in which the permeate back pressure in the area is greater than the pressure of the feed stream and flowing the permeate stream radially within said two or more separate sealed permeate flow compartments sufficient to reduce substantially membrane wrinkling and membrane seam leaks.

7. The method of claim 6 wherein the permeate back pressure membrane area comprises about 10% or less of the membrane area of the membrane leaf means.

8. The method of claim 6 wherein the pressure difference across the membrane leaf compartments is greater than about 15 psi.

9. The method of claim 6 wherein the flux of the membrane leaf means is 50 liters per square meter of membrane area per hour or more.

10. The method of claim 6 wherein the inlet pressure of the feed stream into the membrane module is about 200 psi or less.

11. The method of claim 6 which comprises subdividing the permeate flow compartment by a straight, radial adhesive zone into two generally equal separate compartments and flowing the permeate stream radially in each separate compartment into the central tube permeate collection means.

12. The method of claim 6 wherein the feed stream comprises a dairy stream.

* * * * *